United States Patent Office 3,409,665
Patented Nov. 5, 1968

3,409,665
PRODUCTION OF ACRYLIC ACID
Christopher John Brown, Walton-on-the-Hill, Tadworth, and Frank Christopher Newman, Great Bookham, England, assignors to The Distillers Company Limited, Edinburgh, Scotland, a British company
No Drawing. Filed Aug. 3, 1965, Ser. No. 477,010
Claims priority, application Great Britain, Sept. 5, 1964, 36,490/64
7 Claims. (Cl. 260—530)

ABSTRACT OF THE DISCLOSURE

Process for producing acrylic acid in higher yield from a mixture of acrylic acid and acrolein wherein a catalytic oxidation process is used to convert the acrolein to acrylic acid, the improvement which involves subjecting the mixture of acrolein and acrylic acid to the oxidation process in an iron or iron alloy reactor, the surfaces of which coming in contact with said mixture have been rendered inert by chemical treatment.

---

The present invention relates to the production of unsaturated aliphatic acids and in particular to the production of acrylic acid.

Processes for the production of acrylic acid by the catalytic vapor phase oxidation of propylene or acrolein at elevated temperature are known. Thus our copending application 4804/64 describes a process for the production of acrolein and acrylic acid from propylene or acrolein by vapor phase oxidation at an elevated temperature in the presence of an oxide composition containing antimony and vanadium alone or together with other metals such as titanium, chromium, manganese, iron, cobalt, nickel, copper, zinc, moylbdenum, cadmium, tungston, thorium or tin.

Processes employing propylene as starting material may be operated in two stages in which, in the first stage, propylene is reacted in the presence of any of the above catalysts to produce a mixture of acrolein and acrylic acid and in a second stage the reaction gases from the first stage reactor with or without the extraction of the acrylic acid already formed are reacted to complete the conversion of acrolein to acrylic acid. The second stage reactor may contain an identical or similar catalyst to the first or alternatively a catalyst already known for the conversion of acrolein to acrylic acid e.g. cobalt molybdate.

It has now been found that when operating by passage of the total effluent from the first stage to the second stage reactor i.e. without intemediate separation of acrylic acid produced in the first stage reactor, burning of such acrylic acid to produce the oxides of carbon and water is experienced in the second stage reactor resulting in an overall loss in yield of acrylic acid.

It is an object of the present invention to prevent or substantially reduce this burning of acrylic acid when contained in admixture with acrolein as feed to an oxidation reaction for the production of acrylic acid.

Accordingly the present invention is a process for the production of acrylic acid which comprises reacting acrolein in admixture with acrylic acid with molecular oxygen in the vapour phase at an elevated temperature over an oxidation catalyst in a reactor fabricated of stainless steel, or iron or an iron alloy having an inert surface.

The catalyst used in the proces of the present invention may be any one of a number known for this reaction and is usually a compound of a heavy metal of Group VI of the Periodic Table. Particularly suitable catalysts are molybdates, for instance molybdates of bismuth, cobalt, tin, vanadium, iron, antimony, cerium, titanium, nickel, tungsten or bismuth phosphomolybdate. A partciularly suitable catalyst comprises cobalt molybdate.

Iron surfaces of the catalytic reactor are preferably rendered inert by chemical treatment. For example according to a preferred embodiment of the invention an inert layer or film comprising either antimony metal or a metal phosphate is formed on the reactor surface.

To effect formation of an inert metal phosphate coating on the iron surfaces these surfaces may first be cleaned to remove scale by for example sand or shot blasting and then are dipped in a suitable solution containing phosphate ions. Suitable solutions comprise phosphoric acid or ammonium phosphate, which produce a coating of iron phosphate on the metal surface by chemical reaction with the surface, or solutions of, for example, iron, manganese, zinc or cadmium phosphates in water or dilute phosphoric acid which produce coatings consisting of iron phosphate in admixture with the particular metal phosphate employed.

The duration of contact between the surfaces and the phosphate solution is dependent on the temperature and concentration of the solution. For example employing a dipping solution comprising phosphoric acid of strength 20 to 25% by volume at ambient temperautre a contact time of about 2 hours may be necessary whereas with such a solution at about 60° C. the contact time may be reduced to about 20 to 30 minutes. At the end of this treatment the reactor is drained and allowed to dry in contact with warm air. It will also be appreciated that the length of contact time determines the thickness of the coating.

To effect formation of an antimony metal coating the iron surfaces after cleaning are immersed in a hot alkaline solution of an antimony salt. For example a suitable solution may be prepared by dissolving antimony oxide in a solution of sodium hydroxide. The immersion is carried out at or near the boiling point of the solution. The contact time advantageously employed will again depend on the concentration of the antimony solution. For example with an aqueous solution containing 7% by weight antimony trioxide and 50% sodium hydroxide at 150° C. a suitable contact time was 30 minutes. In general contact times varying from 10 to 30 minutes are employed.

The treatment such as is described above has been found to produce particularly effective results on materials of construction such as carbon or low alloy steels, for example, so called "mild steel," which because of their relatively low cost find partciular application in the construction of chemical reactors.

The process of the present invention may be conveniently combined with a process for the production of mixtures of acrolein and acrylic acid by the vapour phase catalytic oxidation of propylene thereby affording a two stage process for the production of acrylic acid from propylene. In such a process the propylene may be reacted in a first stage with molecular oxygen in the vapour phase at an elevated temperature over an oxide composition containing antimony and vanadium alone or together with one or more of the polyvalent metals titanium, chromium, manganese, iron, cobalt, nickel, copper, zinc, molybdenum, cadmium, tungsten, thorium and tin as catalyst to give a reaction product containing acrolein and acrylic acid, and thereafter passage of the total reaction products into a second stage in which acrolein is reacted with molecular oxygen at an elevated temperature in the vapour phase over an oxidation catalyst to produce acrylic acid, the second reactor being fabricated of stainless steel, or iron or an iron alloy having an inert surface.

The oxide composition catalyst used in the first stage of such a process must include antimony, vanadium and oxygen and may be regarded as containing either a mixture of antimony and vanadium oxides or an oxygen-containing compound of antimony and vanadium, such as antimony vanadate or a mixture of an antimony oxide with other metal vanadates. The catalyst may be prepared in a number of ways, for example by admixture of antimony and vanadium oxides or by co-precipitation from solution of antimony and vanadium compounds if necessary aided by the addition of ammonia or a water-soluble amine. The additional polyvalent metal or metals if included may be added for example in the form of the oxide, hydroxide, carbonate or nitrate or by co-precipitation with the antimony and vanadium. By whichever method the catalyst is prepared it is found advantageous to subject it to prior heat-treatment for example at a temperature in the range 500 to 1100° C. preferably above 600° C. The catalyst may if desired be deposited on a suitable support material e.g. silica or alumina.

The two stages of the reaction may be carried out in any suitable manner, for instance as a fixed or fluidised bed process, and using the proportions of reactants and diluents, reaction temperatures and flow rates which are already known in this art. The addition of further quantities of the reactants, for example, molecular oxygen, to the gas stream between the reactors may also be used.

The process of the present invention is described in more detail with reference to the following example:

Example

A steel reactor containing a tin/vanadium/antimony oxide catalyst was coupled to another steel reactor containing a cobalt molybdate catalyst.

With interstage removal of acrylic acid, a total yield of 41% acrylic acid was obtained. When the total effluent of the first reactor was passed directly into the untreated second reactor, the maximum total yield of acrylic acid was only 31–32%.

After treating the second reactor with 10% v./v. Jenolite solution at 60° C. for 2 hours the experiment was repeated and the difference in acrylic acid yields between the two systems found to be only 1–1.5%.

We claim:
1. In the process for producing acrylic acid wherein a mixture of acrylic acid and acrolein is oxidized in the vapor phase in the presence of molecular oxygen over an oxidation catalyst at an elevated temperature, thereby to oxidize said acrolein to acrylic acid, the improvement which comprises treating said mixture in a reactor fabricated of iron or an iron alloy and having an inert surface consisting of an antimony metal layer or a metal phosphate layer in contact with said mixture.

2. A process as claimed in claim 1 wherein the oxidation catalyst is a molybdate of bismuth, cobalt, tin, vanadium, iron, antimony, cerium, titanium, nickel, tungsten or bismuth phosphomolybdate.

3. The process of claim 1 wherein the inert surface consists of iron phosphate.

4. The process of claim 1 wherein the inert surface consists of antimony metal.

5. The process of claim 3 wherein the phosphate surface is formed by treatment of the reactor surface with a liquid solution containing phosphoric acid, ammonium phosphate, iron phosphate, manganese phosphate, zinc phosphate, or cadmium phosphate.

6. The process of claim 4 wherein the antimony metal layer is formed by treatment of the reactor surface with a hot alkaline solution of antimony oxide.

7. The process of claim 1 wherein said mixture is derived from the vapor phase oxidation of propylene.

References Cited
UNITED STATES PATENTS

| | | | |
|---|---|---|---|
| 2,881,212 | 4/1959 | Idol et al. | 260—530 |
| 2,941,007 | 6/1960 | Callahan et al. | 260—533 |
| 3,009,943 | 11/1961 | Hadley et al. | 260—465.3 |
| 3,065,264 | 11/1962 | Koch et al. | 260—533 |
| 3,238,253 | 3/1966 | Kerr | 260—530 |
| 2,275,466 | 3/1942 | Pollack et al. | 260—656 |

OTHER REFERENCES

Adams et al., J. of Catalysis, April 1964, p. 379.

LORRAINE A. WEINBERGER, *Primary Examiner.*

V. GARNER, *Assistant Examiner.*